United States Patent
Kunz et al.

(10) Patent No.: US 12,479,592 B2
(45) Date of Patent: Nov. 25, 2025

(54) AIRCRAFT MASK MONITORING SYSTEM

(71) Applicant: The Boeing Company, Chicago, IL (US)

(72) Inventors: Jared B. Kunz, Kent, WA (US); Robert J. Rencher, Normandy Park, WA (US)

(73) Assignee: The Boeing Company, Arlington, VA (US)

( * ) Notice: Subject to any disclaimer, the term of this patent is extended or adjusted under 35 U.S.C. 154(b) by 468 days.

(21) Appl. No.: 17/453,639

(22) Filed: Nov. 4, 2021

(65) Prior Publication Data

US 2022/0348352 A1    Nov. 3, 2022

Related U.S. Application Data

(60) Provisional application No. 63/201,480, filed on Apr. 30, 2021.

(51) Int. Cl.
*B64D 45/00* (2006.01)
*A61B 5/00* (2006.01)
*B64D 11/06* (2006.01)

(52) U.S. Cl.
CPC .......... *B64D 45/00* (2013.01); *B64D 11/0632* (2014.12); *A61B 5/6803* (2013.01)

(58) Field of Classification Search
CPC ................ B64D 45/00; B64D 11/0632; B64D 2045/0085; B64D 2231/00; A61B 5/6803
See application file for complete search history.

(56) References Cited

U.S. PATENT DOCUMENTS

| 11,338,158 B2 * | 5/2022 | Wenzel | A62B 7/02 |
| 11,666,786 B1 * | 6/2023 | Opperman | A61B 5/097 |
| | | | 128/204.22 |

(Continued)

OTHER PUBLICATIONS

"Aviation Oxygen Passenger Masks: Pressurized or Unpressurized Aircraft," Aviation Oxygen, Available Online at https://www.aviationoxygen.com/aviation-oxygen-passenger-masks/, Available as Early as Oct. 21, 2020, 4 pages.

(Continued)

*Primary Examiner* — Navid Z. Mehdizadeh
*Assistant Examiner* — Shelley Marie Osterhout
(74) *Attorney, Agent, or Firm* — Alleman Hall & Tuttle LLP

(57) ABSTRACT

An aircraft mask monitoring system is provided, which includes a plurality of masks respectively corresponding to a plurality of seats in an aircraft. The masks are configured to deliver oxygen. Each mask includes at least one of a plurality of sensors, and each sensor is configured to detect an operational parameter of the respective mask as sensor data. The system further includes one or more processors configured to communicate with the sensors via a wired or wireless connection, receive the sensor data from the sensors, store the sensor data in an associated storage device, and process the sensor data using anomaly detection logic to generate a sensor data report. The sensor data report includes an anomaly state of at least one mask. The one or more processors are further configured to output the sensor data report for display on a client computing device.

20 Claims, 9 Drawing Sheets

(56) References Cited

U.S. PATENT DOCUMENTS

| | | | | |
|---|---|---|---|---|
| 2007/0271009 | A1* | 11/2007 | Conroy, Jr. | B64D 13/00 |
| | | | | 701/10 |
| 2009/0014003 | A1* | 1/2009 | Degenhardt | B64D 11/00 |
| | | | | 244/118.5 |
| 2012/0044092 | A1* | 2/2012 | Shore | B64F 5/00 |
| | | | | 340/945 |
| 2013/0019865 | A1* | 1/2013 | Gu | A62B 27/00 |
| | | | | 128/202.22 |
| 2017/0371328 | A1* | 12/2017 | Waddington | G05B 23/0218 |
| 2018/0078798 | A1* | 3/2018 | Fabian | A62B 18/10 |
| 2019/0308579 | A1* | 10/2019 | Jouper | G01G 19/07 |
| 2022/0257886 | A1* | 8/2022 | Cui | A61M 16/0051 |

OTHER PUBLICATIONS

"Continuous Flow Mask," Daerospace, Available Online at http://daerospace.com/oxygen-systems/continuous-flow-mask/, Available as Early as Apr. 8, 2018, 3 pages.

"Daerospace Oxygen System Overview," Daerospace, Available Online at http://daerospace.com/oxygen-systems/overview/, Available as Early as Apr. 8, 2018, 6 pages.

Ashish, "Do Airplanes Really Carry Oxygen for the Oxygen Masks?" Science ABC, Available Online at https://www.scienceabc.com/eyeopeners/do-airplanes-really-carry-oxygen-for-the-oxygen-masks.html, Sep. 15, 2021, 6 pages.

* cited by examiner

FIG. 6

AIRCRAFT MASK MONITORING SYSTEM

CROSS REFERENCE TO RELATED APPLICATIONS

This application claims priority to U.S. Provisional Patent Application Ser. No. 63/201,480, filed Apr. 30, 2021, the entirety of which is hereby incorporated herein by reference for all purposes.

FIELD

The present disclosure relates generally to aircraft, and more particularly to the monitoring of oxygen delivery systems.

BACKGROUND

Most aircraft include oxygen delivery systems for passengers and crew to use during emergency events, for example, when the cabin pressurization fails. These systems include masks for delivering oxygen directly to individual people. Passenger masks in particular are relatively simple, typically consisting of a truncated conical cup to be placed on the passenger's face, an elastic band to secure the cup in place, a tube connecting the mask to an oxygen source, and a reservoir bag. Passengers are instructed in how to use the masks, and individuals unable to properly use a mask during an emergency event due to improper use or a medical emergency may end up relying on fellow passengers or crew to visually notice the issue, and therefore may be overlooked.

In addition, maintaining such systems to ensure proper deployment during an emergency event can be complex, involving overhaul, testing, inspection, repair, replacement, recertification, scheduling time for maintenance, and accommodation of Aircraft-on-Ground events. It may be more cost effective to simply discard and replace many components on a periodic schedule based on a predicted lifespan, or after each emergency event, rather than test each individual component. This can result in unnecessary replacements and the associated costs for implementing the replacements, or faulty equipment not being discovered in advance of scheduled maintenance.

SUMMARY

To address the above issues, according to one aspect of the present disclosure, an aircraft mask monitoring system is provided herein. In this aspect, the aircraft mask monitoring system includes a plurality of masks respectively corresponding to a plurality of seats in an aircraft, wherein the masks are configured to deliver oxygen. The aircraft mask monitoring system includes a plurality of sensors, wherein each of the plurality of masks includes at least one of the plurality of sensors, and wherein each sensor is configured to detect an operational parameter of the respective mask as sensor data. The aircraft mask monitoring system further includes one or more processors configured to communicate with the plurality of sensors via a wired or wireless connection, receive the sensor data from the plurality of sensors, store the sensor data in an associated storage device, process the sensor data using anomaly detection logic to generate a sensor data report, wherein the sensor data report includes an anomaly state of at least one mask from the plurality of masks, and output the sensor data report for display on a client computing device.

Another aspect of the present disclosure relates to a method of operating an aircraft mask monitoring system, the system comprising a plurality of masks respectively corresponding to a plurality of seats in an aircraft, and the masks configured to deliver oxygen. In this aspect, the method includes providing each of the plurality of masks with at least one of a plurality of sensors, detecting, as sensor data, at least one operational parameter of a mask from the plurality of masks, and receiving the sensor data from the plurality of sensors at one or more processors. The method further includes storing the sensor data in an associated storage device, processing the sensor data using anomaly detection logic to generate a sensor data report, wherein the sensor data report includes an anomaly state of at least one mask from the plurality of masks, and outputting the sensor data report for display on a client computing device.

Still another aspect of the present disclosure relates to a mask for oxygen delivery in an aircraft. In this aspect, the mask includes a mask body configured to cover a nose and mouth of a passenger, a bag connected to the mask body and to an oxygen source, and a plurality of sensors configured to detect a plurality of operational parameters of the mask as sensor data. The plurality of sensors include a carbon dioxide sensor, a mask state sensor, an oxygen flow sensor, a temperature sensor, and a humidity sensor. The plurality of sensors are configured to communicate the sensor data to one or more processors via a wired or wireless connection.

BRIEF DESCRIPTION OF THE DRAWINGS

FIG. 6 shows a detailed view of the operations center view of FIG. 5.

DETAILED DESCRIPTION

Figure 1:
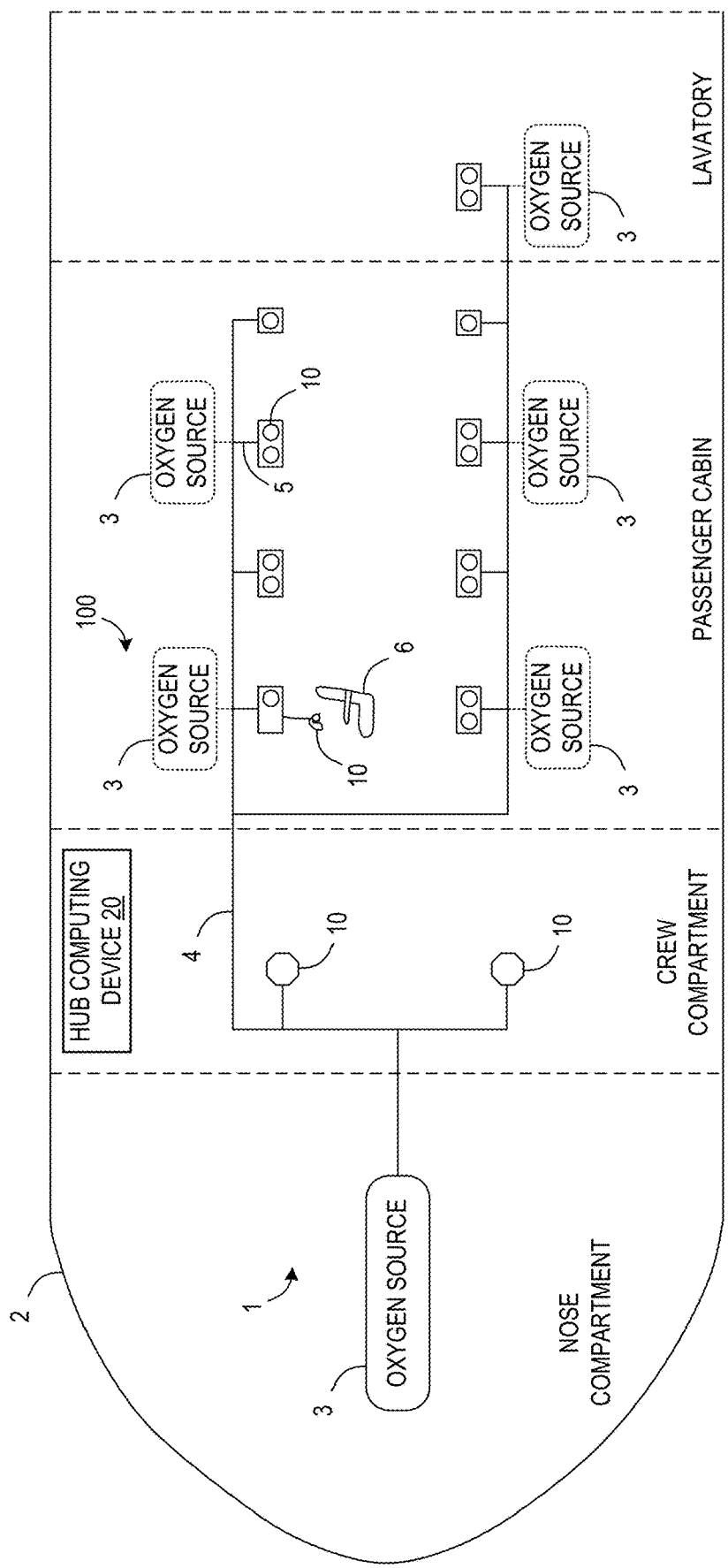
FIG. 1 shows an aircraft mask monitoring system applied to an emergency oxygen supply system onboard an aircraft.

FIG. 1 shows an aircraft mask monitoring system 100 applied to an emergency oxygen supply system 1 onboard an aircraft 2. The emergency oxygen supply system 1 includes an oxygen source 3 such as an oxygen tank or an oxygen generator and tubing 4 for supplying oxygen from the oxygen source 3 to different locations throughout the aircraft 2. The emergency oxygen supply system 1 can further include hoses 5 connecting various masks to the emergency oxygen supply system 1. For example, the aircraft mask monitoring system 100 includes a plurality of masks 10 respectively corresponding to a plurality of seats 6 (only one is illustrated for simplicity) in the aircraft 2. The masks 10 are configured to deliver oxygen to passengers, crew, pilots, etc. In some implementations, the masks 10 are a type provided to passengers in a passenger cabin of the aircraft 2.

Figure 2:
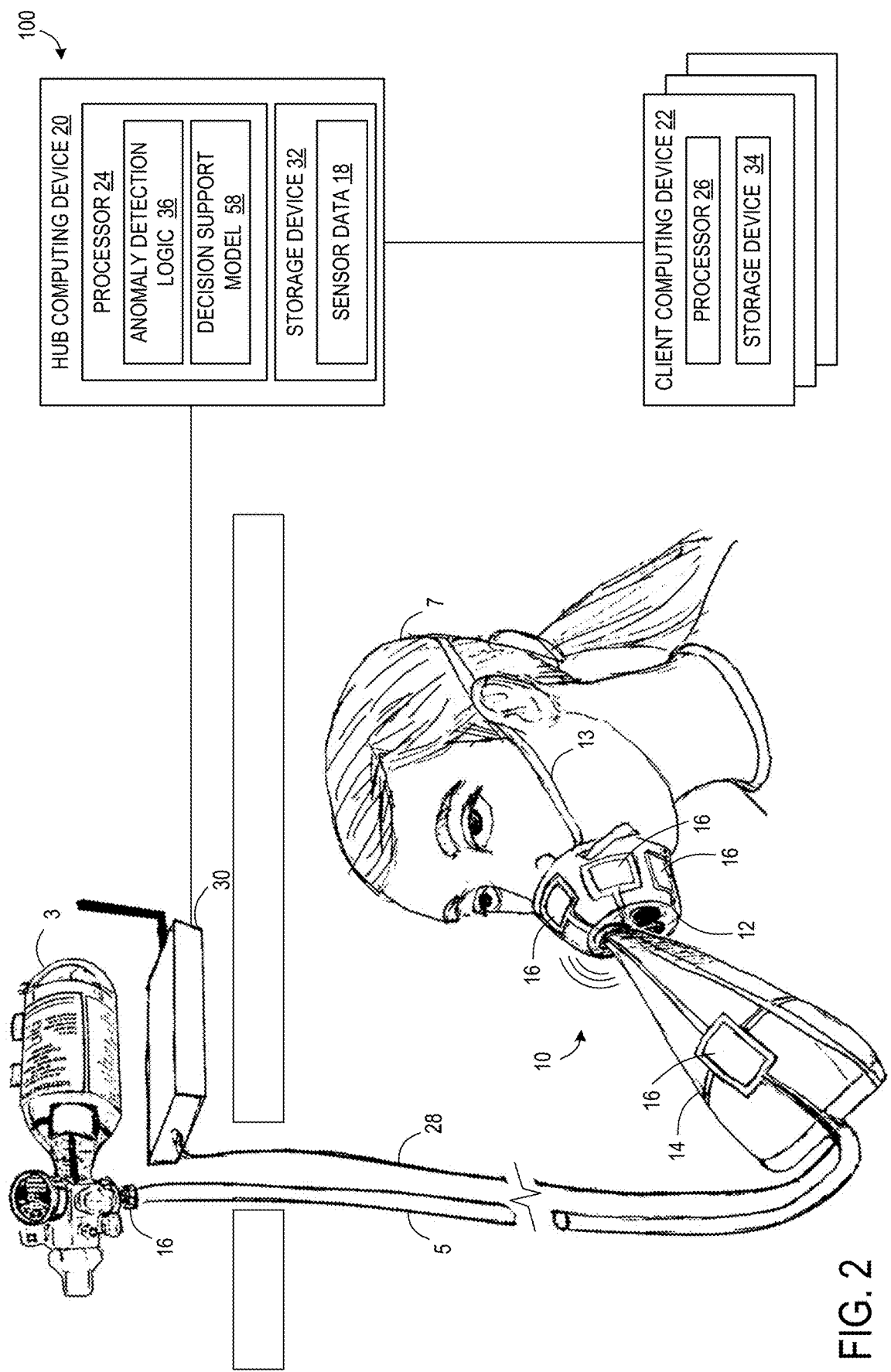
FIG. 2 shows the aircraft mask monitoring system of FIG. 1.
Figure 3:
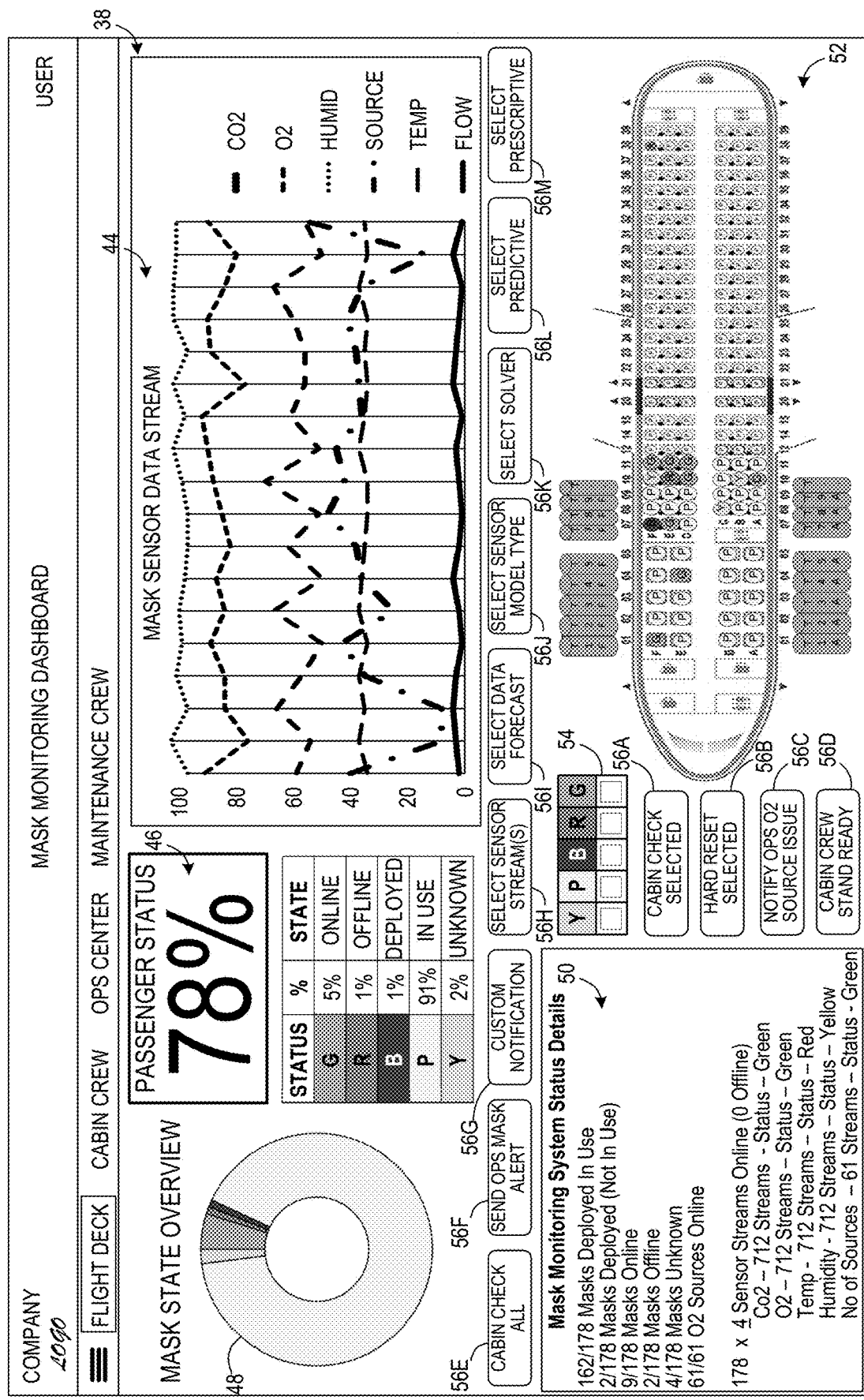
FIG. 3 shows a flight deck view of a dashboard presented by the system of FIG. 1.

FIG. 2 shows the aircraft mask monitoring system 100 of FIG. 1. One of the masks 10 is illustrated by way of example. In one implementation, the mask 10 is for oxygen delivery in the aircraft 2 and includes a mask body 12 configured to cover a nose and mouth of a passenger 7, and a bag 14 connected to the mask body 12 and to an oxygen source 3. An elastic strap 13 may secure the mask body 12 over the passenger's face. The aircraft mask monitoring system 100 includes a plurality of sensors 16, and each of the plurality of masks 10 includes at least one of the plurality of sensors 16. Each sensor 16 is configured to detect an operational parameter of the respective mask 10 as sensor data 18. For example, the plurality of sensors 16 can include one or more of a carbon dioxide sensor, a mask state sensor, an oxygen flow sensor, a temperature sensor, a humidity sensor, an oxygen tank level sensor, and/or an oxygen generator sensor, among others. The oxygen tank level sensor and the oxygen generator sensor can be included depending on the type of oxygen source 3 used in the emergency oxygen supply system 1 and can detect the remaining amount of oxygen left to deliver from the oxygen source 3.

When included, the mask state sensor can detect a state of the respective mask 10, such as "Online," "Offline," "Deployed," "In use," "Maintenance mode," and "Unknown." For example, "Online" can indicate that a mask 10 is ready to be deployed and in working order, "Offline" can indicate that a mask 10 is known to be unavailable to be deployed, "Deployed" can indicate that a mask 10 has been ejected from its storage compartment but is not yet in use, "In use" can indicate that a person is wearing and breathing through a mask, "Maintenance mode" can indicate that the mask is deliberately set into a mode for performing maintenance in which sensor data 18 can be collected in a different manner than during normal operation so as to avoid producing erroneous data, and "Unknown" can indicate an error state. Other suitable statuses may be available. The mask state sensor can include any one or combination of individual sensors such as a touch sensor, an optical sensor, a trigger switch, proximity sensor, etc. The mask state sensor can also be a soft sensor utilizing any combination of the previously discussed sensor types to determine the mask state. Together, the plurality of sensors 16 can be used to monitor the status, condition, and use of the mask 10, as well as the status of the person 7 wearing the mask 10.

The aircraft mask monitoring system 100 includes a hub computing device 20 and any number of client computing devices 22, each including a respective processor 24, 26. Aspects of the aircraft mask monitoring system 100 can be performed by separate computing devices or a combination thereof. The client computing devices 22 can include smartphones, tablets, laptops, and desktop computers, for example. The aircraft mask monitoring system 100 includes one or more processors (e.g., processors 24, 26) configured to communicate with the plurality of sensors 16 via a wired or wireless connection. A wired connection such as by using a cable 28 may reduce a charging and battery replacement burden for the mask 10. A wireless connection may reduce a weight of the mask 10 and can be implemented, for example, via radio transceivers. The one or more processors are configured to receive the sensor data 18 from the plurality of sensors 16. In some situations, the sensor data can be first received by a local access point 30 and then forwarded to the hub computing device 20 or a client computing device 22 over a wired or wireless connection. The wireless connection can be, for example, a mesh network, a Wireless Local Area Network, or short-range radio.

In one implementation, the sensor data 18 is temporarily stored onboard and then forwarded to the hub computing device 20 offsite. In this case, the data can be stored locally and streamed in real time, or alternatively offloaded after the aircraft lands. To reduce the amount of data transferred, the sensor data 18 can be filtered and/or compressed, for example, by reporting only data of particular concern. Data may be further reduced by setting the sampling rate of the plurality of sensors 16 lower in times of inactivity and increasing the sampling rate after a triggering event.

The one or more processors are configured to store the sensor data 18 in an associated storage device (e.g., storage device 32 of the hub computing device 20 or storage device 34 of the client computing device 22). The one or more processors are configured to process the sensor data 18 using anomaly detection logic 36 to generate a sensor data report 38. The sensor data report 38 includes an anomaly state of at least one mask 10 from the plurality of masks 10. Finally, the one or more processors are configured to output the sensor data report 38 for display on the client computing device 22. Examples of the sensor data report are described below with reference to FIGS. 3-8. The sensor data report 38 can be used for a variety of purposes such as monitoring passenger or crew health, directing resources during an emergency, and providing a basis for a customized maintenance schedule.

The sensor data 18 can be stored in the form of time series data, for example. Accordingly, the anomaly detection logic 36 can include, but is not limited to, a time series-based anomaly or outlier detection algorithm using Density Based Spatial Clustering of Applications with Noise (DBSCAN) using a rolling window based DBSCAN, Holt-Winters (i.e., Triple Exponential Smooth), or Auto-Regressive Integrated Moving Average (ARIMA).

In some implementations, the one or more processors 24, 26 can be further configured to output a flight deck view 40 (see FIG. 3) or a cabin crew view 42 (see FIG. 4) on the client computing device 22 in which the sensor data report 38 includes a status of each of the plurality of masks 10, a data stream 44 of the sensor data 18 over a given time period, and a metric 46 indicating passenger health. The flight deck view 40 can be intended to be operated by the pilot, co-pilot, or anyone else in the flight deck of the aircraft 2, while the cabin crew view 42 can be intended to be operated by the cabin crew onboard. These views 40, 42 can allow the aircraft personnel to access the aircraft mask monitoring system 100 and send and receive alerts in a timely fashion. Any of the provided views can be presented on a device installed in the aircraft 2, a desktop computer, a laptop computer, a mobile device such as a tablet or smartphone, etc.

The status is shown by way of example in a chart 48 indicating the proportion of masks 10 of each status by using different colors, and also shown in greater detail in a status detail section 50 below the chart 48. Other methods of displaying the status may be used. In addition, any of the views presented by the client computing device 22 can include an aircraft map 52 where the status of each mask 10, oxygen source 3, etc., monitored by the plurality of sensors 16 may be indicated by color, shape, numerical value, etc. These views 40, 42 can be used by the flight deck and the cabin crew, respectively, to monitor the status of the oxygen delivery system and the plurality of masks at any time, and of the passengers on board during an emergency in which the plurality of masks 10 are deployed. The data stream 44 can display the sensor data 18 as a compilation or average of all or a subset of masks 10, or a single selected mask 10 may be shown.

The metric 46 can provide a simple visual cue of the overall passenger health, the health of a selected subset of passengers, or a specific passenger health if one mask 10 is selected. The metric 46 is illustrated by way of example as a percentage but may take any suitable form, and is determined based at least on the sensor data 18 from the relevant masks 10. The metric 46 can indicate how many passengers are or are not wearing and using a mask 10, or can indicate the overall status of the passengers who are wearing a mask 10. For example, a low oxygen or carbon dioxide flow rate may indicate that a passenger is not getting enough oxygen or is not breathing well, or the mask state could show that the passenger is not wearing the mask correctly, any of which may be considered an example of an anomaly state. The anomaly state can include, for example, at least one of an offline state, an unknown state, a malfunction or depleted state of an associated oxygen tank, a malfunction or depleted state of an oxygen generator, an improperly deployed state, an abnormal breathing state of a person wearing the mask 10, and/or a medical emergency state of the person wearing the mask 10. One oxygen source 3 may deliver oxygen to one or more passengers, and therefore a malfunction or low oxygen supply indicated by the sensor data 18 may affect the health and safety of the relevant passenger(s). A low metric 46 below a predefined threshold value can trigger a preset action such as alerting the crew or emergency responders, or such actions may be triggered by sensor data 18 from any individual or combination of sensors 16 reaching a corresponding threshold value.

As discussed above, the status of each mask 10 and oxygen source 3 may be indicated in the aircraft map 52. In the depicted example, the status is indicated by color and letter. Individual masks 10 can be selected or subset may be selected by status via checkboxes 54. Using the flight deck view 40, a user can select one of several graphical user interface (GUI) objects to perform a desired action. Many different actions are programmable and the actions are not limited to those shown or discussed below. For example, when one or more masks 10 are selected, the user may select an object 56A to direct the cabin crew to perform a cabin check for the corresponding passengers, or select an object 56B in order to reset the sensors 16 of the selected mask(s) 10. As more examples, the user may select an object 56C to notify the operations center located remotely from the aircraft 2 of an issue with one or more of the oxygen sources 3, or an object 56D to notify the cabin crew to stand ready for passenger assistance or further instructions. Additional options may include, for example, an object 56E to issue a cabin check to all passengers, an object 56F to send the operations center a mask alert, an object 56G for setting and sending a custom notification, an object 56H for selecting which sensor data 18 to display in the data stream 44, and one or more objects relating to models used to process the sensor data 18, as discussed below. In some implementations, a simplified version of the flight deck view 40 as well as the views of FIGS. 4-8 are presented when an emergency event has not occurred, with less data and fewer options presented to the user.

The flight deck view 40 can include an object 56I that is selectable to create a forecast of where the sensor data 18 will be within a certain time, e.g., 45 minutes to an hour, using data analytics forecasting methods. The user can select the object 56I to activate an "auto-forecast" option for a specified period of time which will provide a simulation according to the current sensor data 18 and reference models that the aircraft mask monitoring system 100 has been trained on. Alternatively, the user can select specific models such as certain time series models like ARIMA or GARCH by selecting the object 56J. An object 56K can be selected to activate mathematical solvers, and an object 56L can be selected to display a predictive model of what might happen with the sensor data 18 in the future.

The one or more processors 24, 26 can be further configured to execute a decision support model 58 (see FIG. 2) that is trained to receive the sensor data 18 and output a recommended mask action 60 in view of the anomaly state, such as alerting the user, the crew, the operations center, or emergency responders that the passenger wearing the mask 10 requires assistance. The decision support model 58 can be a prescriptive model that runs in an automatic mode, or is activated by selecting an object 56M. For example, in the cabin crew view 42 of FIG. 4, one mask 10 is highlighted on the aircraft map 52 where the decision support model 58 has determined that the wearer of the mask 10 has likely been unable to properly wear the mask 10 based on the sensor data 18, and has output the recommended mask action 60 "ASSIST PASSENGER 7F WITH MASK." Other potential recommended mask actions 60 may include dispatching medical attention, prioritizing certain passengers in an emergency landing, resetting the sensors 16, changing altitude, resolving passenger mask issues on a certain side of the plane, and so on. In this manner, the aircraft mask monitoring system 100 can assist the aircraft personnel in ensuring safety and directing resources where they are most needed.

Figure 4:
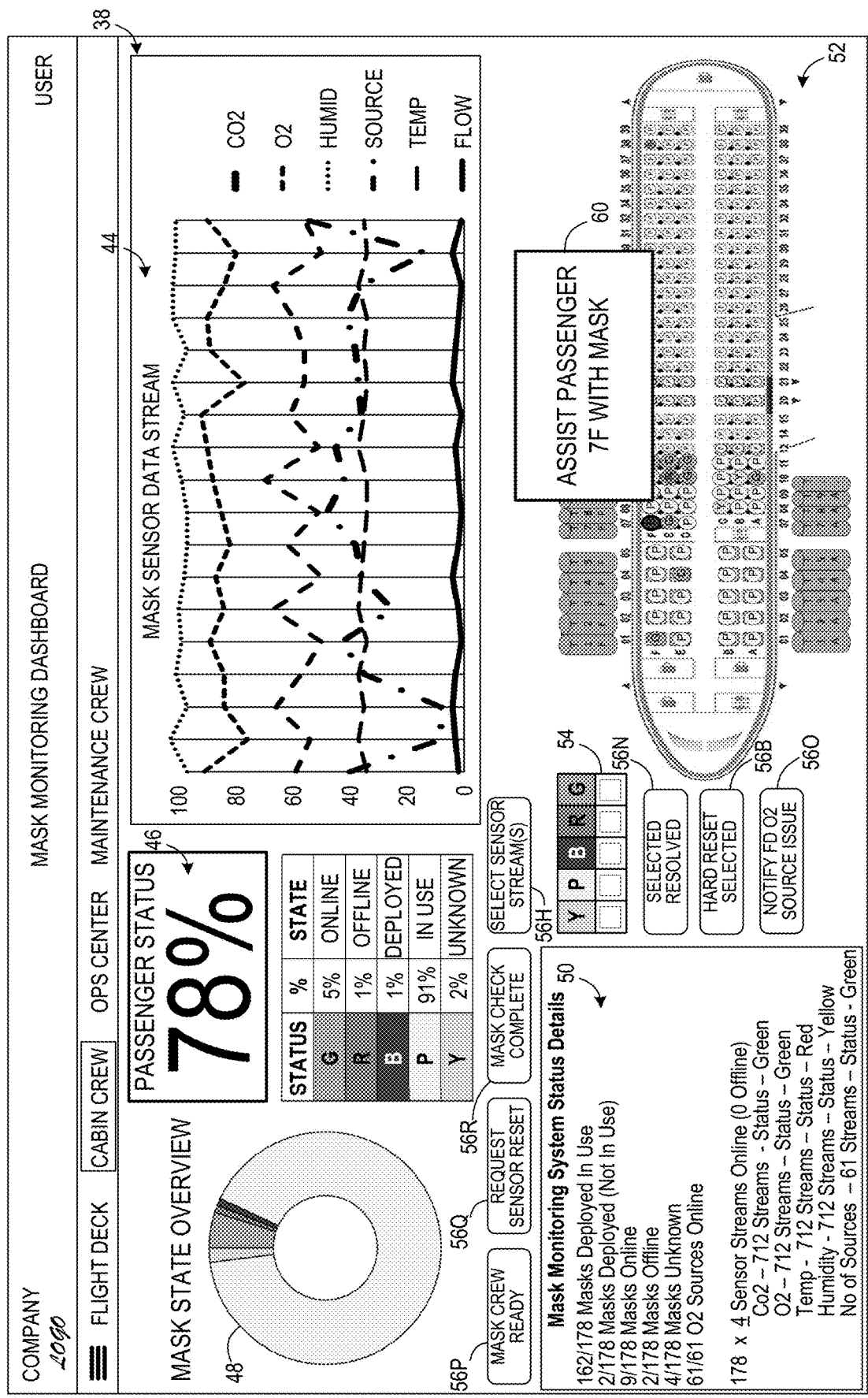
FIG. 4 shows a cabin crew view of a dashboard presented by the system of FIG. 1.

The cabin crew view 42 of FIG. 4 can include some of the same GUI objects as the flight deck view 40 and/or different objects. For example, the cabin crew view 42 can include an object 56N to indicate that the issues for the selected masks 10 are resolved, the object 56B to reset the sensors 16 of the selected mask(s) 10, an object 56O to notify the flight deck of an issue with the oxygen source, an object 56P to indicate that the cabin crew is ready to perform tasks related to the aircraft mask monitoring system 100, an object 56Q to request a complete sensor reset by the flight deck or operations center, an object 56R to confirm that the requested mask check has been completed, the object 56H for selecting which sensor data 18 to display in the data stream 44, and so on.

The one or more processors 24, 26 can be further configured to output an operations center view 62 (see FIG. 5) on the client computing device 22 in which the sensor data report 38 includes the data stream 44 of the sensor data 18 over a given time period. The operations center view 62 can be intended to be used by the operations center staff which is located remotely from the aircraft. The operations center view 62 can include many of the GUI objects displayed in the flight deck view 40. In some implementations, the one or more processors 24, 26 can be further configured to send the flight deck or cabin crew of the aircraft an alert based on the anomaly state. For example, the alert such as the recommended mask action 60 in FIG. 4 or any other suitable alert can be sent to the flight deck or cabin crew automatically due to the execution of the decision support model 58, or may be sent after the user selects a GUI object such as the object 56E, an object 56S for sending the flight deck a mask alert, the object 56G, the object 56A, the object 56B, an object 56T for notifying the flight deck of an issue with an oxygen source 3, or an object 56U for notifying the flight deck or cabin crew to stand ready for passenger assistance or further instructions.

Figure 5:
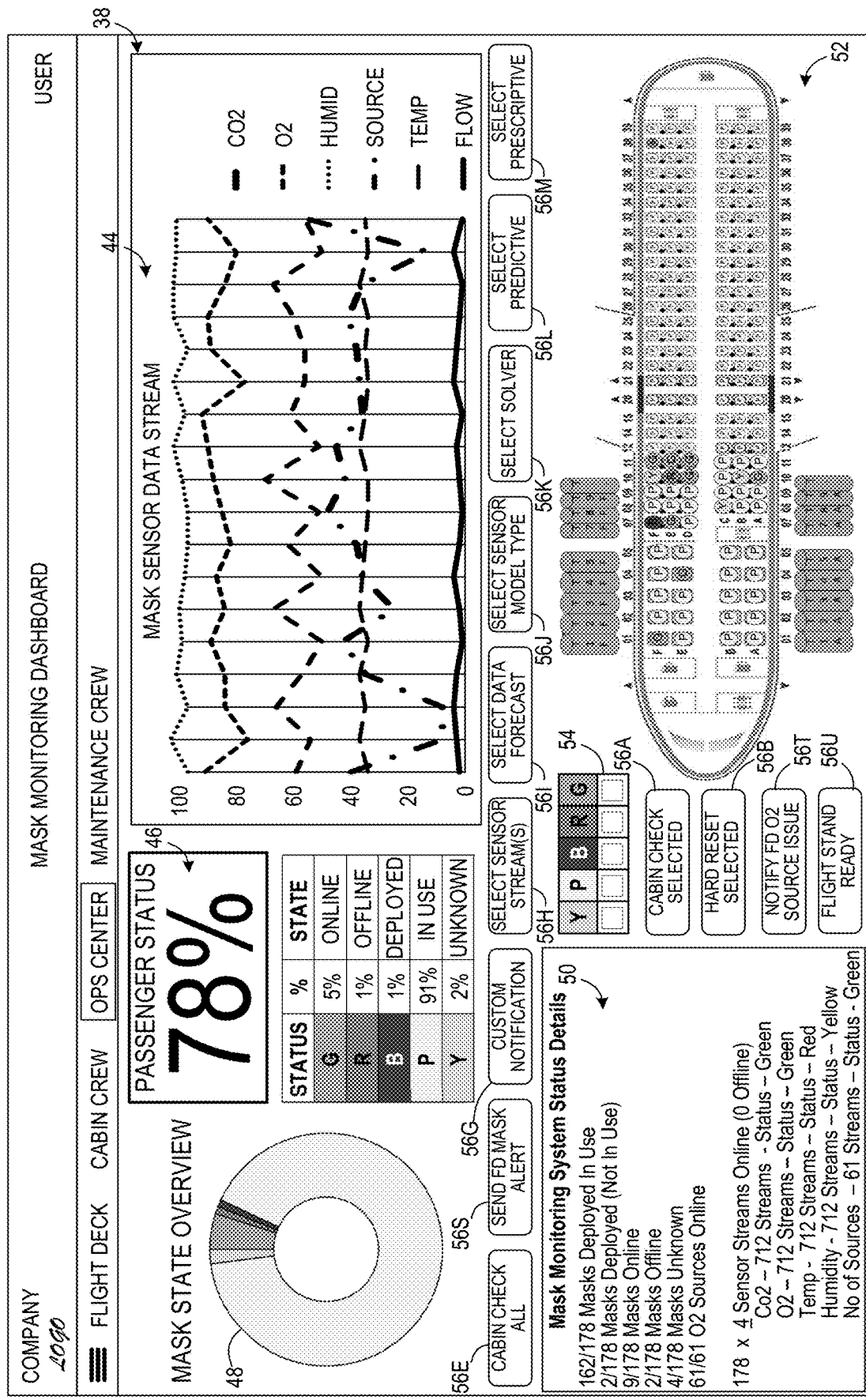
FIG. 5 shows an operations center view of a dashboard presented by the system of FIG. 1.
Figure 6:
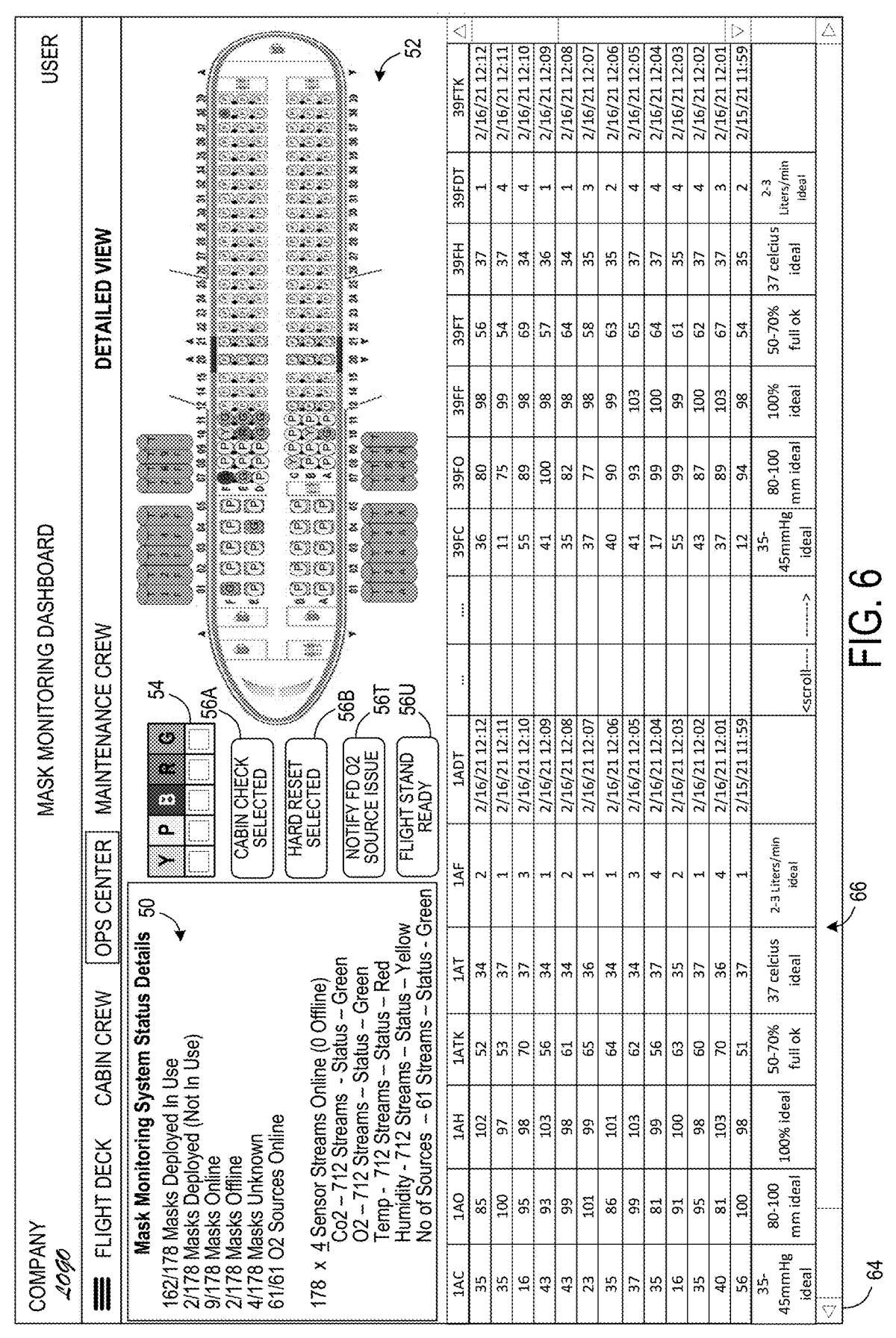

FIG. 6 shows a detailed view 64 of the operations center view 62 of FIG. 5 by way of example. Other authorized users such as the maintenance crew or flight deck may also have permission to view a similar detailed view. The detailed view 64 can be used to view detailed statistical data, streaming sensor data 18, or other detailed data related to the aircraft mask monitoring system 100. One page 66 is illustrated by way of example, but additional pages of data may be accessible via tabs or menu options. In the example of FIG. 6, detailed sensor data is displayed with ideal ranges/values in the bottom row for reference. Additional datapoints are viewable by scrolling horizontally or vertically.

Figure 7:
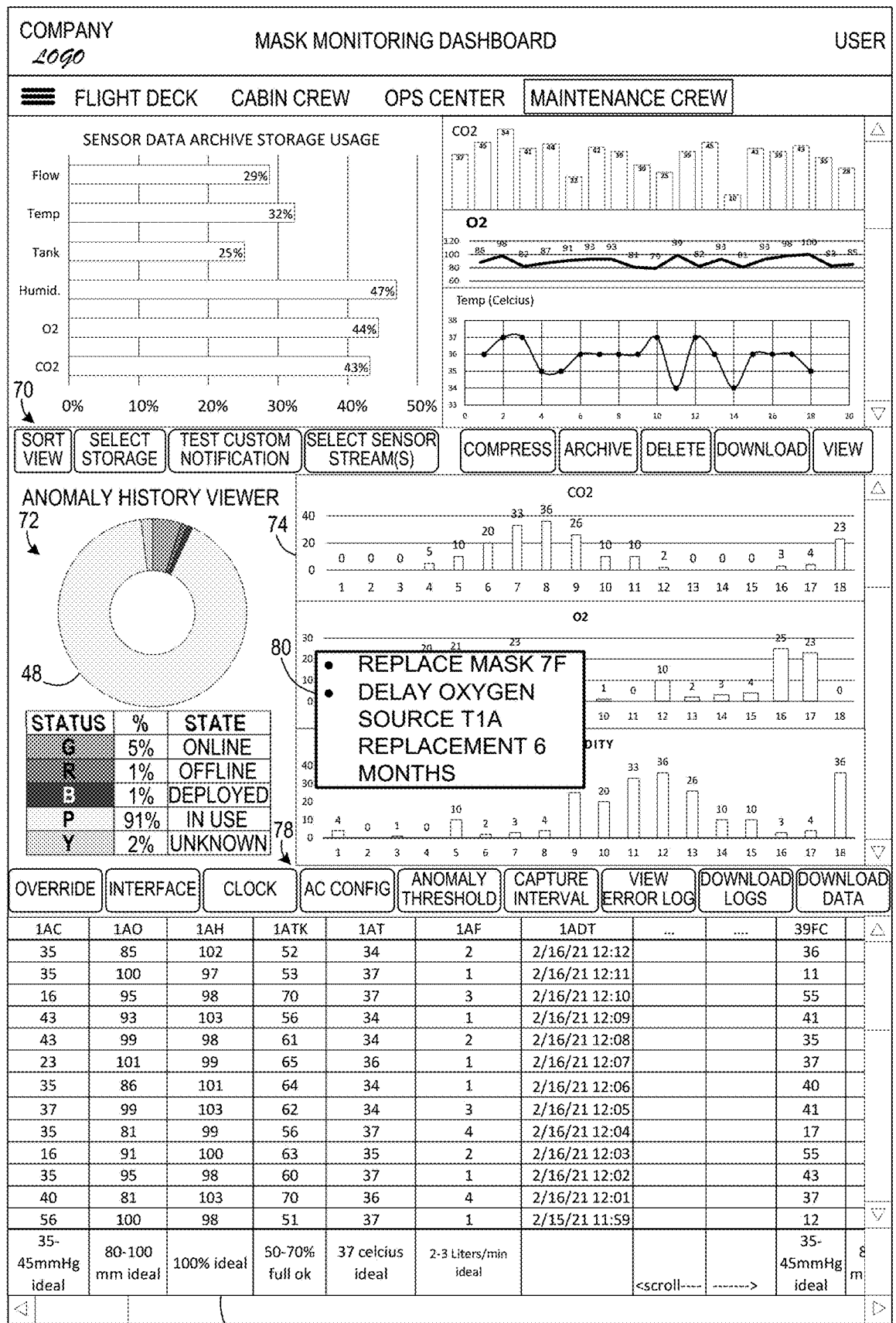
FIG. 7 shows a maintenance view of a dashboard presented by the system of FIG. 1.

In some implementations, the one or more processors 24, 26 can be further configured to output stored historical sensor data 18 for display in a maintenance view 68 on the client computing device 22, as shown in FIG. 7. As opposed to the views of FIGS. 4-6, the maintenance view 68 is typically not used during an emergency event, but instead during a maintenance check of the aircraft 2 which may occur at regular intervals or be prompted due to an earlier event. GUI objects 70 can be used to view, sort, and select the stored historical sensor data 18, as well as test the notification system. Additional objects 70 can be used to access settings for auto compression, archiving, deleting, downloading, and viewing the stored historical sensor data 18. In some implementations, the one or more processors 24, 26 can be further configured to reduce a sampling rate of the plurality of sensors 16, or filter the sensor data 18 before storing, when collecting the sensor data 18 as the stored historical sensor data 18. This procedure may be automatic, or may be implemented by, for example, the user selecting the objects 70 to adjust the settings. Reducing the amount of data needing to be transferred, stored, and processed in this manner can save time and storage costs.

An anomaly history viewer 72 can be provided for visualization after an event in which an anomaly state is detected. In the depicted example, the anomaly history viewer 72 includes the chart 48 and a series of graphs 74 of the sensor data 18. A detailed data viewer 76 similar to the detailed view 64 of FIG. 6 can be provided, and GUI objects 78 can be used to override malfunctioning mask states, provide an application programming interface (API) for the client computing device 22 used by the maintenance crew for in-depth reconfiguring of the aircraft mask monitoring system 100, adjust or reset a clock of a mask 10 or of an oxygen source 3, configure the sensors 16 for a specific aircraft layout, set thresholds for what constitutes an anomaly state, set data capture intervals, view error logs, download error logs, or download sensor data 18. These GUI objects are merely an example and other functionality may be provided in a suitable manner.

The one or more processors 24, 26 can be further configured to send the stored historical sensor data 18 for a period of time including a plurality of flights to the client computing device 22 during a maintenance inspection. Once received, the data can be analyzed in order to further train any of the models used by the aircraft mask monitoring system 100. In some implementations, the stored historical sensor data can provide a basis for a customized maintenance schedule. In this case, the one or more processors 24, 26 can be further configured to output a recommended maintenance action 80 based on the stored historical sensor data 18 and the anomaly state. For example, the recommended maintenance action 80 can include replacing a component of the aircraft mask monitoring system 100 before a periodic component lifetime has elapsed, such as "REPLACE MASK 7F" because the aircraft mask monitoring system 100 has determined that the particular mask 10 was faulty. In another example, the recommended maintenance action 80 can include deferring replacing a component of the aircraft mask monitoring system despite a scheduled lifetime elapsing, such as "DELAY OXYGEN SOURCE T1A REPLACEMENT 6 MONTHS" because the aircraft mask monitoring system 100 has determined that the particular oxygen source 3 is in unusually good condition despite being at the end of its planned lifetime. That is, in some cases, the anomaly state may be a positive. In addition, the anomaly may occur during normal, non-emergency usage. For example, a mask may deploy, partially deploy, or become unable to deploy, and the recommended maintenance action 80 can include replacing or repairing the mask at the soonest opportunity. Aside from replacement, other maintenance actions such as repairing, cleaning, etc., may be part of the customized maintenance schedule. In this manner, the aircraft mask monitoring system 100 can avoid unnecessary costly maintenance procedures while ensuring safety.

Figure 8:
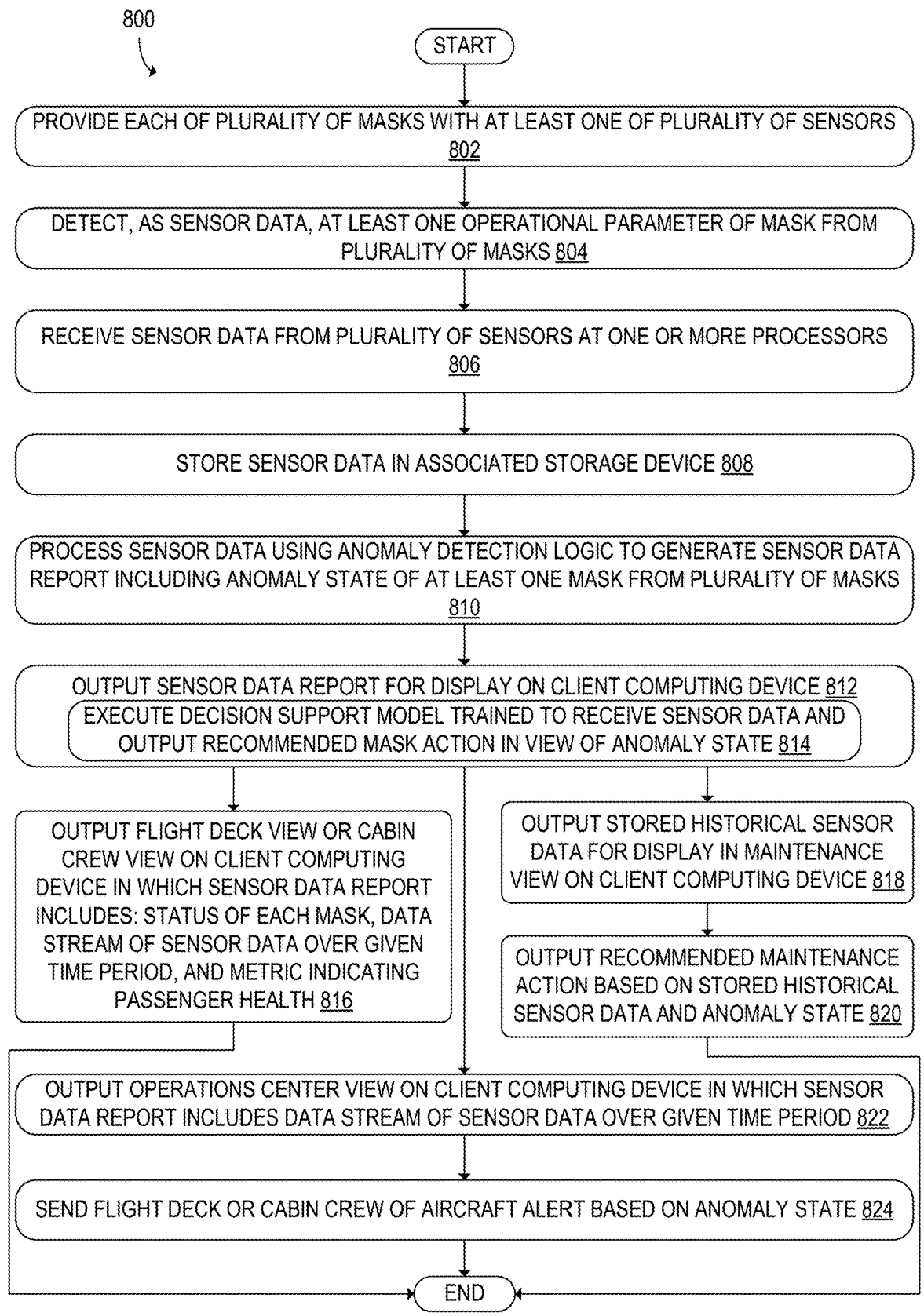
FIG. 8 shows a method of operating an aircraft mask monitoring system.

FIG. 8 shows a method 800 of operating an aircraft mask monitoring system. The following description of method 800 is provided with reference to the system 100 comprising the plurality of masks 10 respectively corresponding to a plurality of seats in the aircraft 2, as described above and shown in FIG. 2. It will be appreciated that method 800 may also be performed in other contexts using other suitable components.

With reference to FIG. 8, at 802, the method 800 includes providing each of the plurality of masks with at least one of a plurality of sensors. The plurality of sensors can include, for example, one or more of a carbon dioxide sensor, a mask state sensor, an oxygen flow sensor, a temperature sensor, a humidity sensor, an oxygen tank level sensor, and/or an oxygen generator sensor. At 804, the method 800 includes detecting, as sensor data, at least one operational parameter of a mask from the plurality of masks. At 806, the method 800 includes receiving the sensor data from the plurality of sensors at one or more processors. At 808, the method 800 includes storing the sensor data in an associated storage device. At 810, the method 800 includes processing the sensor data using anomaly detection logic to generate a sensor data report, wherein the sensor data report includes an anomaly state of at least one mask from the plurality of masks. At 812, the method 800 includes outputting the sensor data report for display on a client computing device. In this manner, anomalies in the masks can be reported to persons in charge in situations of search and rescue, emergency landings, medical emergencies, routine and emergent maintenance, and so on. As discussed above, the anomaly state can include at least one of an offline state, an unknown state, a malfunction or depleted state of an associated oxygen tank, a malfunction or depleted state of an oxygen generator, an improperly deployed state, an abnormal breathing state of a person wearing the mask, and/or a medical emergency state of the person wearing the mask, among other states.

In some implementations, at 814, the method 800 includes executing a decision support model that is trained to receive the sensor data and output a recommended mask action in view of the anomaly state. The recommended mask action can be output together with the sensor data report for display on the client computing device. The sensor data report can be outputted in a variety of views for use by various parties, as illustrated at FIGS. 3-7. At 816, the method 800 includes outputting a flight deck view or a cabin crew view on the client computing device in which the sensor data report includes: a status of each of the plurality of masks, a data stream of the sensor data over a given time period, and a metric indicating passenger health. In this manner, the flight deck and crew can be presented with access to the sensor data report and any recommended mask action during a flight or emergency event. At 818, the method 800 includes outputting stored historical sensor data for display in a maintenance view on the client computing device, and at 820, outputting a recommended maintenance action based on the stored historical sensor data and the anomaly state. In this manner, the maintenance can be improved using recommendations from the aircraft mask monitoring system. For example, the recommended maintenance action can include replacing a component of the aircraft mask monitoring system before a scheduled lifetime has elapsed, or the recommended maintenance action can include deferring replacing a component of the aircraft mask monitoring system despite a scheduled lifetime elapsing. Finally, at 822, the method 800 includes outputting an operations center view on the client computing device in which the sensor data report includes a data stream of the sensor data over a given time period, and at 824, sending a flight deck or cabin crew of the aircraft an alert based on the anomaly state. In this manner, the aircraft mask monitoring system can assist the operations center in managing the personnel aboard the aircraft in the presence of safety issues.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
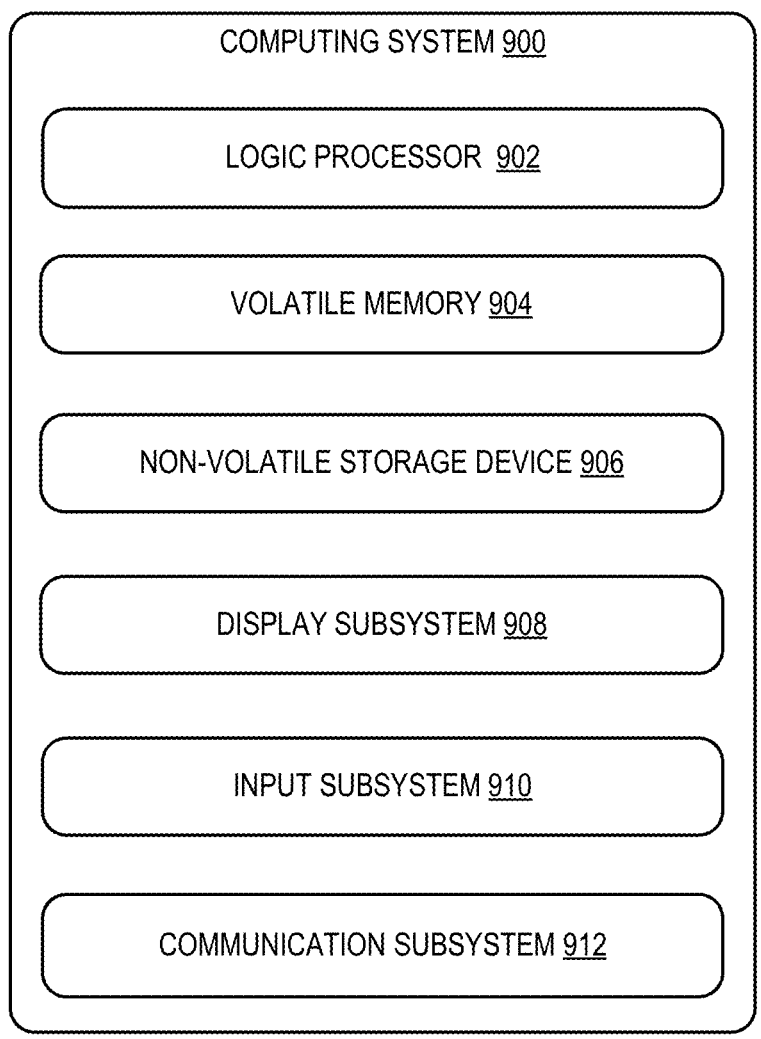
FIG. 9 shows a schematic view of an example computing system.

FIG. 9 schematically shows a non-limiting embodiment of a computing system 900 that can enact one or more of the methods and processes described above. Computing system 900 is shown in simplified form. Computing system 900 may embody the aircraft mask monitoring system 100 described above and illustrated in FIG. 2. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 904, and a non-volatile storage device 906. Computing system 900 may optionally include a display subsystem 908, input subsystem 910, communication subsystem 912, and/or other components not shown in FIG. 9.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 906 includes one or more physical devices configured to hold instructions executable by the logic processors to implement the methods and processes described herein. When such methods and processes are implemented, the state of non-volatile storage device 906 may be transformed—e.g., to hold different data.

Non-volatile storage device 906 may include physical devices that are removable and/or built-in. Non-volatile storage device 906 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 906 may include nonvolatile, dynamic, static, read/write, read-only, sequential-access, location-addressable, file-addressable, and/or content-addressable devices. It will be appreciated that non-volatile storage device 906 is configured to hold instructions even when power is cut to the non-volatile storage device 906.

Volatile memory 904 may include physical devices that include random access memory. Volatile memory 904 is typically utilized by logic processor 902 to temporarily store information during processing of software instructions. It will be appreciated that volatile memory 904 typically does not continue to store instructions when power is cut to the volatile memory 904.

Aspects of logic processor 902, volatile memory 904, and non-volatile storage device 906 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 900 typically implemented in software by a processor to perform a particular function using portions of volatile memory, which function involves transformative processing that specially configures the processor to perform the function. Thus, a program may be instantiated via logic processor 902 executing instructions held by non-volatile storage device 906, using portions of volatile memory 904. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

When included, display subsystem 908 may be used to present a visual representation of data held by non-volatile storage device 906. The visual representation may take the form of a graphical user interface (GUI). As the herein described methods and processes change the data held by the non-volatile storage device, and thus transform the state of the non-volatile storage device, the state of display subsystem 908 may likewise be transformed to visually represent changes in the underlying data. Display subsystem 908 may include one or more display devices utilizing virtually any type of technology. Such display devices may be combined with logic processor 902, volatile memory 904, and/or non-volatile storage device 906 in a shared enclosure, or such display devices may be peripheral display devices.

When included, input subsystem 910 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 912 may be configured to communicatively couple various computing devices described herein with each other, and with other devices. Communication subsystem 912 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

The following paragraphs provide additional support for the claims of the subject application. One aspect provides an aircraft mask monitoring system. The aircraft mask monitoring system comprises a plurality of masks respectively corresponding to a plurality of seats in an aircraft, wherein the masks are configured to deliver oxygen, a plurality of sensors, wherein each of the plurality of masks includes at least one of the plurality of sensors, and wherein each sensor is configured to detect an operational parameter of the respective mask as sensor data, and one or more processors. The one or more processors are configured to communicate with the plurality of sensors via a wired or wireless connection, receive the sensor data from the plurality of sensors, store the sensor data in an associated storage device, process the sensor data using anomaly detection logic to generate a sensor data report, wherein the sensor data report includes an anomaly state of at least one mask from the plurality of masks, and output the sensor data report for display on a client computing device. In this aspect, additionally or alternatively, the one or more processors are further configured to execute a decision support model that is trained to receive the sensor data and output a recommended mask action in view of the anomaly state. In this aspect, additionally or alternatively, the anomaly state includes at least one of an offline state, an unknown state, a malfunction or depleted state of an associated oxygen tank, a malfunction or depleted state of an oxygen generator, an improperly deployed state, an abnormal breathing state of a person wearing the mask, and/or a medical emergency state of the person wearing the mask. In this aspect, additionally or alternatively, the one or more processors are further configured to output stored historical sensor data for display in a maintenance view on the client computing device, and output a recommended maintenance action based on the stored historical sensor data and the anomaly state. In this aspect, additionally or alternatively, the recommended maintenance action includes replacing a component of the aircraft mask monitoring system before a periodic component lifetime has elapsed. In this aspect, additionally or alternatively, the recommended maintenance action includes deferring replacing a component of the aircraft mask monitoring system despite a scheduled lifetime elapsing. In this aspect, additionally or alternatively, the one or more processors are further configured to reduce a sampling rate of the plurality of sensors, or filter the sensor data before storing, when collecting the sensor data as the stored historical sensor data, and send the stored historical sensor data for a period of time, including a plurality of flights, to the client device during a maintenance inspection. In this aspect, additionally or alternatively, the one or more processors are further configured to output a flight deck view or a cabin crew view on the client computing device in which the sensor data report includes a status of each of the plurality of masks, a data stream of the sensor data over a given time period, and a metric indicating passenger health. In this aspect, additionally or alternatively, the one or more processors are further configured to output an operations center view on the client computing device in which the sensor data report includes a data stream of the sensor data over a given time period, and send a flight deck or cabin crew of the aircraft an alert based on the anomaly state. In this aspect, additionally or alternatively, the plurality of sensors include one or more of a carbon dioxide sensor, a mask state sensor, an oxygen flow sensor, a temperature sensor, a humidity sensor, an oxygen tank level sensor, and/or an oxygen generator sensor.

Another aspect provides a method of operating an aircraft mask monitoring system, the system comprising a plurality of masks respectively corresponding to a plurality of seats in an aircraft, the masks configured to deliver oxygen. The method comprises providing each of the plurality of masks with at least one of a plurality of sensors, detecting, as sensor data, at least one operational parameter of a mask from the plurality of masks, receiving the sensor data from the plurality of sensors at one or more processors, storing the sensor data in an associated storage device, processing the sensor data using anomaly detection logic to generate a sensor data report, wherein the sensor data report includes an anomaly state of at least one mask from the plurality of masks, and outputting the sensor data report for display on a client computing device. In this aspect, additionally or alternatively, the method further comprises executing a decision support model that is trained to receive the sensor data and output a recommended mask action in view of the anomaly state. In this aspect, additionally or alternatively, the anomaly state includes at least one of an offline state, an unknown state, a malfunction or depleted state of an associated oxygen tank, a malfunction or depleted state of an oxygen generator, an improperly deployed state, an abnormal breathing state of a person wearing the mask, and/or a medical emergency state of the person wearing the mask. In this aspect, additionally or alternatively, the method further comprises outputting stored historical sensor data for display in a maintenance view on the client computing device, and outputting a recommended maintenance action based on the stored historical sensor data and the anomaly state. In this aspect, additionally or alternatively, the recommended maintenance action includes replacing a component of the aircraft mask monitoring system before a scheduled lifetime has elapsed. In this aspect, additionally or alternatively, the recommended maintenance action includes deferring replacing a component of the aircraft mask monitoring system despite a scheduled lifetime elapsing. In this aspect, additionally or alternatively, the method further comprises outputting a flight deck view or a cabin crew view on the client computing device in which the sensor data report includes a status of each of the plurality of masks, a data stream of the sensor data over a given time period, and a metric indicating passenger health. In this aspect, additionally or alternatively, the method further comprises outputting an operations center view on the client computing device in which the sensor data report includes a data stream of the sensor data over a given time period, and sending a flight deck or cabin crew of the aircraft an alert based on the anomaly state. In this aspect, additionally or alternatively, the plurality of sensors include one or more of a carbon dioxide sensor, a mask state sensor, an oxygen flow sensor, a temperature sensor, a humidity sensor, an oxygen tank level sensor, and/or an oxygen generator sensor.

Another aspect provides a mask for oxygen delivery in an aircraft. The mask comprises a mask body configured to cover a nose and mouth of a passenger, a bag connected to the mask body and to an oxygen source, and a plurality of sensors configured to detect a plurality of operational parameters of the mask as sensor data. The plurality of sensors include a carbon dioxide sensor, a mask state sensor, an oxygen flow sensor, a temperature sensor, and a humidity sensor, and the plurality of sensors are configured to communicate the sensor data to one or more processors via a wired or wireless connection.

"And/or" as used herein is defined as the inclusive or $\vee$, as specified by the following truth table:

| A | B | A $\vee$ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems, and configurations, and other features, functions, acts, and/or properties.

The invention claimed is:

1. An aircraft mask monitoring system, comprising:
a plurality of masks respectively corresponding to a plurality of passenger seats in an aircraft, wherein the masks are configured to deliver oxygen to passengers;
a plurality of sensors, wherein each of the plurality of masks includes at least one of the plurality of sensors, and wherein each sensor is configured to detect an operational parameter of the respective mask as sensor data; and
one or more processors configured to:
communicate with the plurality of sensors via a wired or wireless connection;
receive the sensor data from the plurality of sensors;
store the sensor data in an associated storage device;
process the sensor data using anomaly detection logic to generate a sensor data report, wherein the sensor data report includes an anomaly state of at least one mask from the plurality of masks;
output a flight deck view or a cabin crew view for display in a graphical user interface (GUI) of a first client computing device of a flight deck or a cabin crew of the aircraft;
output the sensor data report for display in the flight deck view or the cabin crew view, in which the sensor data report includes:
a status of each of the plurality of masks;
a data stream of the sensor data over a given time period; and
a metric indicating passenger health;
output a maintenance view for display in a GUI of a second client computing device of a maintenance crew;
receive user input on at least one GUI object in the maintenance view to adjust settings;
in response to the user input, reduce a sampling rate of the plurality of sensors or filter the sensor data, when collecting the sensor data as stored historical sensor data;
output the stored historical sensor data for display in the maintenance view; and
generate and output a customized maintenance schedule based on the stored historical sensor data and the anomaly state for display in the maintenance view, the customized maintenance schedule including:
replacing a first component of the aircraft mask monitoring system before a periodic component lifetime has elapsed; and
deferring replacing a second component of the aircraft mask monitoring system despite a scheduled lifetime elapsing.

2. The aircraft mask monitoring system of claim 1, wherein the one or more processors are further configured to execute a decision support model that is trained to receive the sensor data and output a recommended mask action in view of the anomaly state.

3. The aircraft mask monitoring system of claim 1, wherein the anomaly state includes at least one of an offline state, an unknown state, a malfunction or depleted state of an associated oxygen tank, a malfunction or depleted state of an oxygen generator, an improperly deployed state, an abnormal breathing state of a person wearing the mask, and/or a medical emergency state of the person wearing the mask.

4. The aircraft mask monitoring system of claim 1, wherein the one or more processors are further configured to send the stored historical sensor data for a period of time, including a plurality of flights, to the second client computing device during a maintenance inspection.

5. The aircraft mask monitoring system of claim 1, wherein the one or more processors are further configured to:
output an operations center view for display in a GUI of a third client computing device of an operations center located remotely from the aircraft, in which the sensor data report includes the data stream of the sensor data over a given time period; and
send the flight deck or the cabin crew of the aircraft an alert based on the anomaly state.

6. The aircraft mask monitoring system of claim 1, wherein the plurality of sensors include one or more of a carbon dioxide sensor, a mask state sensor, an oxygen flow sensor, a temperature sensor, a humidity sensor, an oxygen tank level sensor, and/or an oxygen generator sensor.

7. The aircraft mask monitoring system of claim 1, wherein the metric is a percentage indicating the overall health of the plurality of passengers.

8. The aircraft mask monitoring system of claim 1, wherein based on a selection of one or more of the plurality of passengers, the metric indicates the passenger health of the selected one or more passengers.

9. A method of operating an aircraft mask monitoring system, the system comprising a plurality of masks respectively corresponding to a plurality of passenger seats in an aircraft, the masks configured to deliver oxygen to passengers, the method comprising:
   providing each of the plurality of masks with at least one of a plurality of sensors;
   detecting, as sensor data, at least one operational parameter of a mask from the plurality of masks;
   receiving the sensor data from the plurality of sensors at one or more processors;
   storing the sensor data in an associated storage device;
   processing the sensor data using anomaly detection logic to generate a sensor data report, wherein the sensor data report includes an anomaly state of at least one mask from the plurality of masks;
   outputting the sensor data report for display on a first client computing device of at least one of a flight deck, a cabin crew, or an operations center;
   outputting stored historical sensor data for display in a maintenance view in a graphical user interface (GUI) of a second client computing device;
   receiving user input on at least one GUI object in the maintenance view to adjust settings;
   in response to the user input, reducing a sampling rate of the plurality of sensors or filtering the sensor data, when collecting the sensor data as the stored historical sensor data; and
   generating and outputting a customized maintenance schedule based on the stored historical sensor data and the anomaly state for display in the maintenance view, the customized maintenance schedule including:
      replacing a first component of the aircraft mask monitoring system before a periodic component lifetime has elapsed; and
      deferring replacing a second component of the aircraft mask monitoring system despite a scheduled lifetime elapsing.

10. The method of claim 9, further comprising executing a decision support model that is trained to receive the sensor data and output a recommended mask action in view of the anomaly state.

11. The method of claim 9, wherein the anomaly state includes at least one of an offline state, an unknown state, a malfunction or depleted state of an associated oxygen tank, a malfunction or depleted state of an oxygen generator, an improperly deployed state, an abnormal breathing state of a person wearing the mask, and/or a medical emergency state of the person wearing the mask.

12. The method of claim 9, further comprising outputting a flight deck view or a cabin crew view for display in a GUI of a third client computing device of a flight deck or a cabin crew, in which the sensor data report includes:
   a status of each of the plurality of masks;
   a data stream of the sensor data over a given time period; and
   a metric indicating passenger health.

13. The method of claim 12, wherein the metric is a percentage indicating the overall health of the plurality of passengers.

14. The method of claim 12, wherein based on a selection of one or more of the plurality of passengers, the metric indicates the passenger health of the selected one or more passengers.

15. The method of claim 9, further comprising:
   outputting an operations center view for display in a GUI of a third client computing device of the operations center located remotely from the aircraft, in which the sensor data report includes a data stream of the sensor data over a given time period; and
   sending the flight deck or the cabin crew of the aircraft an alert based on the anomaly state.

16. The method of claim 9, wherein the plurality of sensors include one or more of a carbon dioxide sensor, a mask state sensor, an oxygen flow sensor, a temperature sensor, a humidity sensor, an oxygen tank level sensor, and/or an oxygen generator sensor.

17. An aircraft mask monitoring system, comprising:
   a plurality of masks respectively corresponding to a plurality of passenger seats in an aircraft, wherein the masks are configured to deliver oxygen to passengers;
   a plurality of sensors, wherein each of the plurality of masks includes at least one of the plurality of sensors, and wherein each sensor is configured to detect an operational parameter of the respective mask as sensor data; and
   one or more processors configured to:
      communicate with the plurality of sensors via a wired or wireless connection;
      receive the sensor data from the plurality of sensors;
      store the sensor data in an associated storage device;
      process the sensor data using anomaly detection logic to generate a sensor data report, wherein the sensor data report includes an anomaly state of at least one mask from the plurality of masks;
      output stored historical sensor data for display in a maintenance view of a graphical user interface (GUI) of a client computing device of a maintenance crew of the aircraft;
      output the sensor data report for display in the maintenance view;
      receive user input on at least one GUI object in the maintenance view to adjust settings;
      in response to the user input, reduce a sampling rate of the plurality of sensors or filter the sensor data, when collecting the sensor data as the stored historical sensor data; and
      generate and output a customized maintenance schedule based on the stored historical sensor data and the anomaly state for display in the maintenance view, the customized maintenance schedule including:
         replacing a first component of the aircraft mask monitoring system before a periodic component lifetime has elapsed; and
         deferring replacing a second component of the aircraft mask monitoring system despite a scheduled lifetime elapsing.

18. The aircraft mask monitoring system of claim 17, wherein the plurality of sensors include one or more of a carbon dioxide sensor, a mask state sensor, an oxygen flow sensor, a temperature sensor, a humidity sensor, an oxygen tank level sensor, and/or an oxygen generator sensor.

19. The aircraft mask monitoring system of claim 17, wherein the one or more processors are further configured to execute a decision support model that is trained to receive the sensor data and output a recommended mask action in view of the anomaly state.

20. The aircraft mask monitoring system of claim 17, wherein the anomaly state includes at least one of an offline state, an unknown state, a malfunction or depleted state of an associated oxygen tank, a malfunction or depleted state of an oxygen generator, an improperly deployed state, an abnormal breathing state of a person wearing the mask, and/or a medical emergency state of the person wearing the mask.

* * * * *